P. KEARNY.
TORCH.
APPLICATION FILED OCT. 14, 1916.
1,235,902.
Patented Aug. 7, 1917.
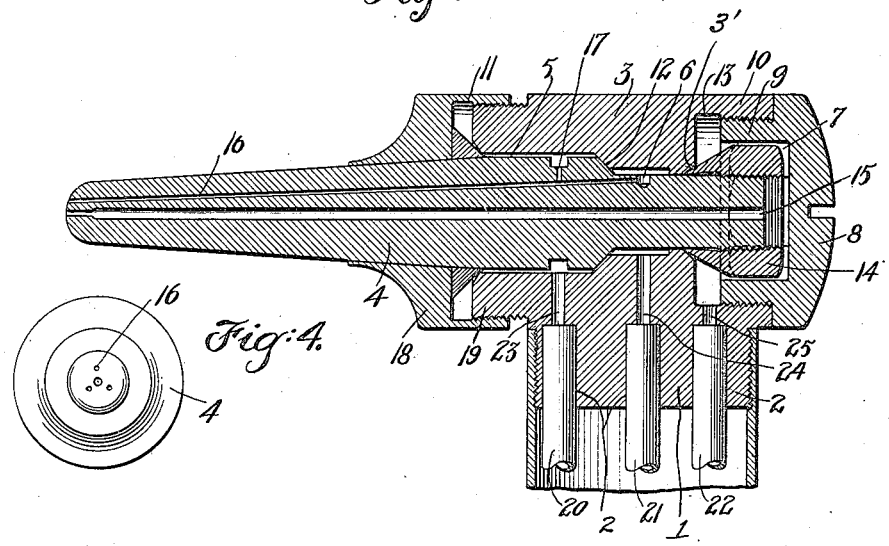
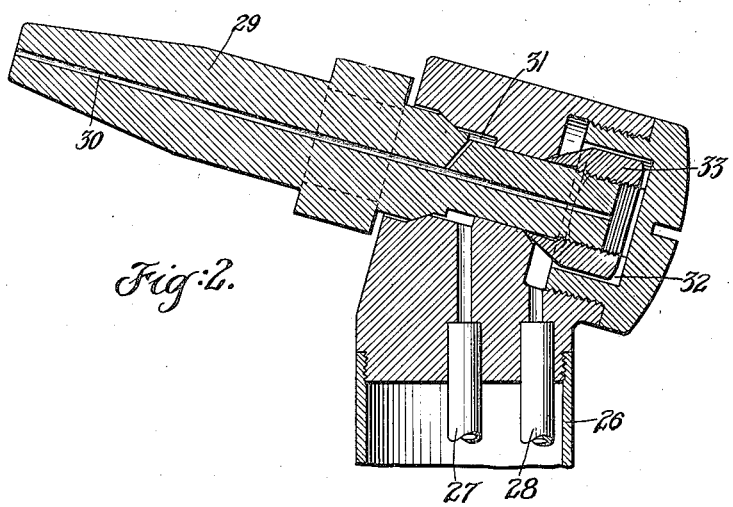
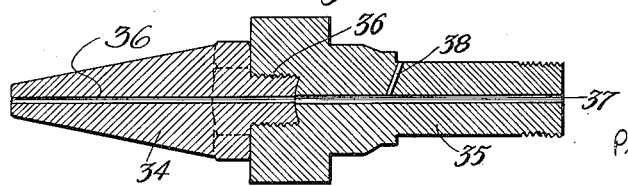
Philip Kearny
INVENTOR
BY Knight Bros
his ATTORNEYS

UNITED STATES PATENT OFFICE.

PHILIP KEARNY, OF MORRISTOWN, NEW JERSEY.

TORCH.

1,235,902.  Specification of Letters Patent.  Patented Aug. 7, 1917.

Application filed October 14, 1916. Serial No. 125,678.

*To all whom it may concern:*

Be it known that I, PHILIP KEARNY, a citizen of the United States, residing at Morristown, in the county of Morris and State of New Jersey, have invented certain new and useful Improvements in Torches, of which the following is a specification.

This invention relates to heating torches, or, as this class of torches is commonly known, cutting and welding torches, in which for example in the welding torch, acetylene and oxygen may be coöperatively employed to produce intense heating effects within limited zones of action. In the cutting torch, oxygen and acetylene may be coöperatively employed to produce intense heating effects, within limited zones in connection with a jet of pure oxygen to produce rapid oxidization or cutting as it is commonly known. The main object of my invention is to provide an improved construction, combination and arrangement of parts including a number of interchangeable tips or nozzles that are necessary in these torches and which will afford positive means for preventing the intermixture of currents of oxygen and acetylene within the torch head. By this means a current of oxygen under high pressure which is used for producing a cutting flame, may be positively prevented from leaking into a low pressure current of oxygen or acetylene or by means of which the current of acetylene may be kept from leaking into the outer atmosphere.

Other and more particular objects of invention will appear in the specification and be pointed out in the appended claims, reference being had to the accompanying drawings which exemplify my invention in several embodiments.

In the drawings,—

Figure 1 is an axial section through the torch head of an oxy-acetylene burner constructed in accordance with the principles of the present invention and adapted to produce a cutting flame;

Fig. 2 is an axial section of a welding torch head;

Fig. 3 is an axial section of a modification;

Fig. 4 is a front elevation of the nozzle tip according to Fig. 1.

In the embodiment of my invention shown in Fig. 1, a depending boss 1 of the torch head 3, is provided with pipe-receiving sockets 2 and with main nozzle-receiving socket bores of different diameter. A nozzle 4 is provided adjacent one end with portions of different diameters, which are arranged within the different bores of the torch head 3 and are spaced from the inner walls of said bores to form chambers, 5 and 6 and 7, said chamber 7 having a cap 8, provided with a contracted portion 9 threaded into the rearwardly projecting screw flange 10 of the torch head 3. Means are provided in chamber 7 for packing the joint between contiguous walls of torch head 3 and tip or nozzle 4, said torch head 3 being chamfered at 3′ to provide a recess of larger angular magnitude than the forwardly presented wedge-shaped nose of the packing element 14 which is adjustably mounted preferably by being threaded on to the inner end of the nozzle 4, thus adapting its forwardly presented nose portion to be wedged into the annular recess formed by the chamfered corner 3′. At the same time by forming this packing element as a nut, the tip or nozzle is securely socketed within the torch head in such a manner as to force a wedge-shaped shoulder 12 on the tip or nozzle 4 into gastight contact with a corresponding annular shoulder on the inner wall of the torch-head 3. In this way two gas-tight chambers 6 and 7 are formed in the torch. The nut 14 is preferably provided with a hexagonal periphery or other suitable form to make it readily adjustable. The inner wall of cap 8 and the outer wall of nut 14 are suitably formed to prevent relative rotation between these parts. The forward end of the torch head 3 is closed by a wedge-shaped packing ring 11, provided with a sharp corner which wedges into the recess formed between contiguous walls of the torch head 3, and tip or nozzle 4. For this purpose the adjacent inner corner of the torch head 3 is chamfered to provide an annular recess of greater angular magnitude than the corner of ring 11 which is wedged thereinto and forms a gas-tight packing for the forward end of chamber 5. Extending throughout the entire length of the tip or nozzle 4 and communicating at its rear end with the chamber 7, is a tubular passage or channel 15. Arranged in a group around the central duct or channel 15 are a plurality of smaller ducts 16 which communicate at their rear ends with the chamber 6. The chamber 5 communicates with the ducts 16 by way of a plurality of radial ducts 17. A packing nut 18 is threaded to the forwardly extending annular portion 19 of the torch head 3 and is adapted thereby to wedge the packing 11 into the angular recess at the forward end of chamber 5. Leading to the chambers 5, 6 and 7, are pipes 20, 21 and 22 which are adapted to convey necessary gases thereto by way of the intermediate ducts 23, 24 and 25. In this embodiment of my invention and for convenience of reference, chamber 5 may be known as the acetylene inlet chamber. Chamber 6 may be termed the low pressure oxygen chamber and chamber 7 may be termed the high pressure oxygen inlet chamber.

In an embodiment of my invention for welding purposes shown in Fig. 2, a tubular handle or housing 26 incloses the tubes 27 and 28 for conveying acetylene and oxygen to acetylene in the chamber 31 and oxygen in the chamber 32. According to this embodiment of my invention, the nozzle 29 is provided with but a single axial duct 30 to which the acetylene from chamber 31 is conveyed by intercommunicating ducts, only one of said ducts being shown. Oxygen from chamber 32 flows into the inner end of duct 30. A packing nut 33 prevents any communication between the chambers 31 and 32. In the modification shown in Fig. 3, a nozzle for welding purposes is constructed in two portions 34 and 35 provided with threaded connections 36. This embodiment is convenient where a small burner tip is required, it being possible when desired to make the tip 34 of one metal, such for example as brass and with a relatively small duct 36', while the portion 35 may be made of another metal such for example as copper and with a relatively large duct 37. A radial duct 38 is provided to lead acetylene or other gas into the central duct 37.

In the use of my improved torch for cutting purposes, any leakage of acetylene from chamber 5 is positively prevented by the wedge-shaped packing 11, the sharp rearwardly presented corner of which is pinched between the inside corner of the chamfered forward end of the torch head 3 and the outer curved wall of the tip or nozzle 4. This action may be carried out in any necessary degree by screwing down the packing nut 18. Previously to this however, the packing nut 14 has been screwed home to make a positive gas tight joint at 12 while at the same time, the forwardly tapered annular edge of the nut 14 is pinched down on to the outer wall of tip or nozzle 4 and between it and the inner corner of the chamfered surface 3'. It will be understood, therefore that this construction provides a positive gas tight joint at 12 between chambers 5 and 6, this being a point where a leak is not noticeable during the use of the tool. At the forward end a leak would be shown by a flame and at once remedied by screwing up the bushing 8, while should there be a leak between chambers 6 and 7, the high pressure oxygen passing into the chamber 6 would extinguish the torch, thus leading to an adjustment of the packing nut 14 to do away with the leak. A decided advantage accrues to a torch constructed according to the present invention in that any of the parts which may be replaced will always be adapted to maintain the gas tight joints between the several chambers.

I claim:—

1. In a torch, a torch head open at both ends and comprising bores of different diameters, a nozzle comprising portions of relatively smaller diameters arranged within and forming chambers corresponding to the different bores, said torch head and nozzle having contacting portions between adjacent chambers, a cap for closing the one end of said torch head and completing a chamber around the inner end of said nozzle, said nozzle being provided with channels communicating with said chambers, and means for delivering gases to said chambers and an adjustable packing for forming a gas tight joint between said nozzle and the inner wall of said torch head at the other open end thereof.

2. In a torch, a torch head comprising bores of different diameters, a nozzle comprising portions of relatively smaller diameters arranged within and forming chambers corresponding to the different bores, said torch head and nozzle having gas tight contacting portions between adjacent chambers, adjustable packings for the ends of said chambers distant from said contacting portions, said nozzle being provided with discharge channels communicating with said chambers, and means for delivering gases to said chambers.

3. In a torch, a torch head comprising bores of different diameters, a nozzle comprising portions of relatively smaller diameters arranged within and forming chambers corresponding to the different bores, said torch head and nozzle having gas tight contacting portions between adjacent chambers, adjustable packings for the ends of said chambers distant from said contacting portions, said nozzle being provided with discharge channels communicating with said chambers, and means for delivering gases to said chambers, one of said packings being threaded to said nozzle and holding said nozzle in position.

4. In a torch, a nozzle provided with portions of different diameter, a torch head having bores of different diameters arranged around and spaced from said portions of the nozzle to form gas chambers, said nozzle and torch head being provided with inclined contacting surfaces between adjacent chambers, a packing ring for one of said chambers, a packing for the other chamber threaded to said nozzle and holding said nozzle in position, a packing nut threaded to said torch head and securing said packing ring in position, and means for supplying gases to said torch head.

5. In a torch, a nozzle provided with portions of different diameter, a torch head having bores of different diameters arranged around and spaced from said portions of the nozzle to form gas chambers, said nozzle and torch head being provided with inclined contacting surfaces between adjacent chambers, a packing ring for one of said chambers, a packing for the other chamber threaded to said nozzle and holding said nozzle in position and a packing nut threaded to said torch head and securing said packing ring in position, and means for supplying gases to said torch head, said torch head being provided with a high pressure chamber extending around said packing threaded to the nozzle.

PHILIP KEARNY.